United States Patent [19]

Clark

[11] Patent Number: 5,617,318
[45] Date of Patent: Apr. 1, 1997

[54] DYNAMICALLY RECONFIGURABLE DATA PROCESSING SYSTEM

[75] Inventor: Stewart A. Clark, Newport Beach, Calif.

[73] Assignee: Northrop Grumman Corporation, Los Angeles, Calif.

[21] Appl. No.: 437,293

[22] Filed: May 8, 1995

[51] Int. Cl.$^6$ .............................. G01J 5/08; G06F 17/00
[52] U.S. Cl. ...................... 364/516; 364/449.1; 250/332; 244/3.16
[58] Field of Search ................................... 364/449, 516; 395/21, 23, 25, 975, 800; 250/330, 332; 244/3.15, 3.16

[56] References Cited

U.S. PATENT DOCUMENTS

| | | | |
|---|---|---|---|
| 3,083,473 | 4/1963 | Luton | 434/34 |
| 3,084,454 | 4/1963 | Schueller | 434/34 |
| 3,247,317 | 4/1966 | Saylor | 358/104 |
| 3,442,139 | 5/1969 | Munro | 73/865.6 |
| 3,694,654 | 9/1972 | Crownover | 250/83.3 |
| 4,106,345 | 8/1978 | Saunders et al. | 73/432 SD |
| 4,387,301 | 6/1983 | Wrick et al. | 250/252.1 |
| 4,482,252 | 11/1984 | Lorenz | 356/448 |
| 4,542,299 | 7/1985 | Scholz et al. | 250/504 R |
| 4,605,232 | 8/1986 | Hundstad | 273/348 |
| 4,621,265 | 11/1986 | Buse et al. | 342/169 |
| 4,639,603 | 1/1987 | Pistor | 250/504 R |
| 4,659,928 | 4/1987 | Tew | 250/332 |
| 4,859,080 | 8/1989 | Titus et al. | 374/134 |
| 4,876,453 | 10/1989 | Wirick | 250/332 |
| 4,922,116 | 5/1990 | Grinberg et al. | 250/495.1 |
| 4,958,180 | 9/1990 | Matsui et al. | 354/403 |
| 4,999,502 | 3/1991 | Midavaine | 250/495.1 |
| 5,129,595 | 7/1992 | Thiede et al. | 244/3.16 |
| 5,175,432 | 12/1992 | Reitman et al. | 250/332 |
| 5,365,460 | 11/1994 | Chung | 364/516 |
| 5,437,030 | 7/1995 | Reitman et al. | 395/650 |
| 5,449,907 | 9/1995 | McKeeman et al. | 250/332 |

FOREIGN PATENT DOCUMENTS

| | | | |
|---|---|---|---|
| 0306391 | 3/1989 | European Pat. Off. | 364/423 |
| 3639541 | 10/1987 | Germany | 250/252.1 |
| 0783601 | 11/1980 | U.S.S.R. | 250/252.1 |

OTHER PUBLICATIONS

Barnes et al., "Calibration of a Satellited Infrared Radiometer", Applied Optics, vol. 19, No. 13, Jul. 1, 1980, pp. 2153–2161.

*Primary Examiner*—Vincent N. Trans
*Attorney, Agent, or Firm*—Stetina Brunda & Buyan

[57] ABSTRACT

Dynamically reconfiguring a space-based data processing system receiving data from infrared detectors, generally comprises selectively processing data based upon evaluations of prior data. The method includes communicating a first portion of unprocessed data from storage to an on-focal-plane data processor for processing, and communicating a second portion of data from storage to an off-focal-plane data processor for processing. Then, the first processed data is sent to the off-focal-plane data processor, and an evaluation of all the processed data takes place. Commands are generated to modify the content of the second portion of unprocessed data. The data "pass-through" accommodates the progressive evolution of algorithms for the on-focal-plane data processor.

6 Claims, 3 Drawing Sheets

DYNAMICALLY RECONFIGURABLE DATA PROCESSING SYSTEM

FIELD OF THE INVENTION

The present invention relates generally to adaptive methods for processing data for space-based surveillance systems, and more particularly to a neural net that selectively processes data from infrared detectors at alternate locations, based upon evaluations of previous data.

BACKGROUND OF THE INVENTION

Space-based surveillance systems use infrared detectors coupled to computerized data processing for monitoring heated objects and their movements. The infrared spectrum covers a wide range of wavelengths, from about 0.75 micrometers to 1 millimeter. The function of infrared detectors is to respond to energy of a wavelength within some particular portion of the infrared region. Heated objects will dissipate thermal energy having characteristic wavelengths within the infrared spectrum. Different levels of thermal energy, corresponding to different sources of heat, are characterized by the emission of signals within different portions of the infrared frequency spectrum. Different levels of thermal energy, corresponding to different sources of heat, are characterized by the emission of signals within different portions of the infrared frequency spectrum. Detectors are selected in accordance with their sensitivity in the range of interest to the designer. Similarly, electronic circuitry that receives and processes the signals from the infrared detectors must also be selected in view of the intended detection function.

Current infrared detection systems incorporate arrays of large numbers of discrete, highly sensitive detector elements the outputs of which are connected to sophisticated processing circuitry. By rapidly analyzing the pattern and sequence of detector element excitations, the system circuitry can identify and monitor sources of infrared radiation. The outputs of the detectors must undergo a series of processing steps in order to permit derivation of the desired information. The more fundamental processing steps include preamplification, tuned bandpass filtering, clutter and background rejection, multiplexing and fixed noise pattern suppression. By providing a detector connecting module that performs at least a portion of the signal processing functions within the module, i.e. on integrated circuit chips disposed adjacent the detector focal plane, the signal from each detector need be transmitted only a short distance before processing.

As a consequence of such on-focal-plane or "up front" signal processing, reductions in size, power and cost of the data processor may be achieved. Volume available aboard spacecraft for large data processors is very limited, and launch costs exceed $3,000 per pound. Moreover, up front signal processing helps alleviate performance and reliability problems associated with the construction of millions of closely spaced conductors connecting each detector element to the main signal processing network.

While the concept of a detector connecting module permits on-focal-plane processing, in practice the on-focal-plane processing is limited due to the fact that the algorithms used to select, rate and process incoming data have yet to be finalized. In order to avoid discarding possibly useful data existing modules largely pass the data from millions of detector elements directly to the off-focal-plane processor. In practice, it may be only after years of space-based experience that the algorithms may be finalized.

In view of the inability of the prior art to develop algorithms on the ground before the launch of space-based surveillance, it is desirable to provide a data processing system that may pass through nearly all the data, but may also adapt to process appropriate portions of the data as algorithms evolve.

SUMMARY OF THE INVENTION

The present invention specifically addresses and alleviates the above-mentioned deficiencies associated with the prior art. Generally, the present invention comprises a method for selectively processing data at alternate locations in an infrared detection system. The selecting of locations for processing and the selecting of data itself from storage is largely based upon evaluations of previous data. Also, the preferred method further includes modifying the processing functions themselves, based upon past data.

The preferred embodiment of the method of the present invention more particularly includes the steps of first receiving data from infrared detectors into an on-focal-plane storage area. Initially, nearly all the data, upon command from a local data processor, is sent to an off-focal-plane data processor for processing. The off-focal-plane processor begins to develop instructions as to selecting data and weighing functions for processing based upon the results of the previous data processing, and sends these instructions to the on-focal data processor. The on-focal data processor may then process some data locally, and send the results to the off-focal data processor. The level of processing activity in the on-focal data processor should increase over time.

An off-focal-plane manager may be added to the loop of data processing. The off-focal manager receives the results of data processing from the off-focal data processor, and sends instructions back to the off-focal data processor. Instructions may also be sent from the off-focal manager to the on-focal data processor.

The method of the present invention is more than a conventional neural net, that provides for improved algorithms based on prior data processing. The present invention provides for an initial broad data "pass-through," to accommodate the progressive evolution of algorithms for the on-focal-plane data processor. In this way, the present invention is a dynamically reconfigurable data processing system, as needed especially for near term space-based surveillance applications.

These, as well as other advantages of the present invention will become more apparent from the following description and drawings. It is understood that changes in the specific structure shown and described may be made within the scope of the claims without departing from the spirit of the invention.

DETAILED DESCRIPTION OF THE PREFERRED EMBODIMENT

Figure 1:
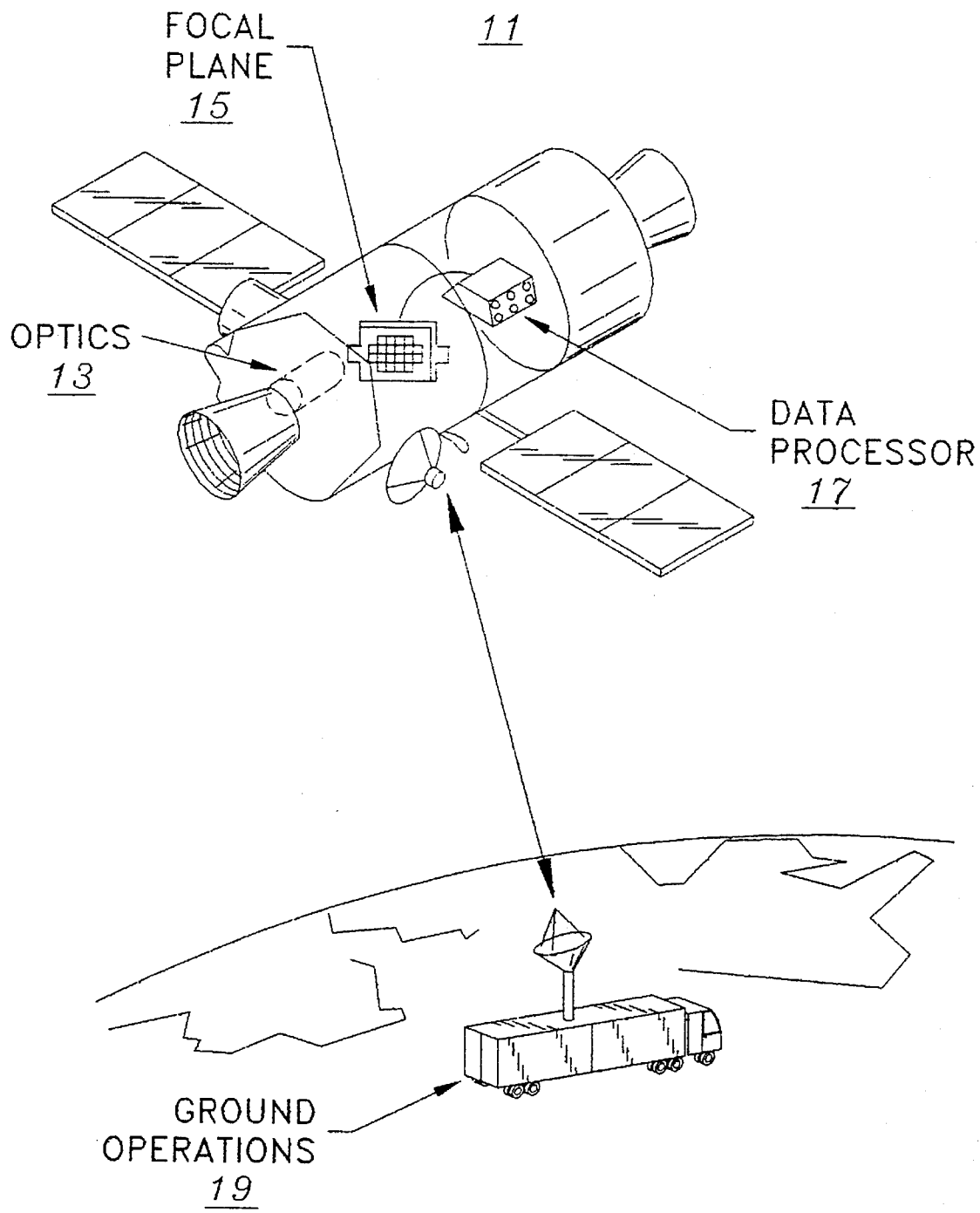
FIG. 1 is a perspective view of an infrared detector system payload disposed in an orbiting satellite.

The detailed discussion set forth below in connection with the appended drawings is intended as a description of the presently preferred embodiment of the invention, and is not intended to represent the only form in which the present invention may be construction or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Applicant's invention may be embodied in a reconfigurable neural net of multi-level data processing, of increased sophistication over time. Initially the local data processor is not adept at recognizing important data form noise level or defective data. Therefore, most of the data bypasses the local processor to a central data processor aboard the spacecraft. As the neural net is "connected" and the higher-level processor learns to recognize important data, more of the processing, including filtering of the data, is deferred to algorithms run on the lower level processor. Once the algorithms are in place and efficiently operating on the lower-level processor, only upon happening of a significant event causing the lower-level processor to become overloaded would data be passed through.

An analogy might be drawn to the way the human brain establishes facilitating and inhibitory connections. An individual placed in an unfamiliar environment (e.g., an astronaut placed on Mars), is initially observant of his or her surroundings and careful in performing simple tasks. After gaining a comfort level with the conditions (on the planet's surface) and confidence in equipment (in the capabilities of the pressurized suit), that individual concentrates on accomplishing more important jobs. But if something unusual happens or problems arise, again the simple tasks are not taken for granted.

Neural nets are particularly appropriate for complex pattern or scene recognition. For a computer to compare each signal received to a complete catalog of possible signals is inefficient. Instead, the computer's memory is "mapped" such that the signal received is compared to only similar stored signals to find the closest match. Then signals closely following in time or neighboring signals received give the processor an indication of the importance of the data. All the signals received serve to improve the "map" in the computer's memory and add to the capability of the processor. The computer learns to discard false data due to noise or momentary/periodic scene variations. Neural networks are especially invaluable for extended space-based surveillance due to their robustness, as they may continue to function and improve despite a significant number of damaged detector elements or other faults in the focal plane.

Applicant's selective processing of the data may be embodied by a broad data pass-through capability to a higher level processor. The higher level processor over time formulates algorithms for increased utilization of the lower-level processor, in processing data by making weighted decisions based on fuzzy, incomplete and contradictory data. The quantity of data pass-through may also dynamically change based upon recent patterns observed by the surveillance system. Increased activity or identification of a signal of particular interest, as perceived by the local processor, may result in the need to analyze more data or more extensively analyze the same data, the increased load prompting data pass-through.

FIG. 1 of the drawings generally illustrates an infrared detector system payload disposed within an orbiting satellite system. The satellite system generally incorporates an optical system which focuses objects within the field of view on the surface of a detector focal plane. The focal plane is formed of electro-optical components adapted to detect objects within the field of view and to generate electrical signals responsive to images of those objects. By analyzing the pattern of information produced by the individual detector elements and correlating that information over time in various ways, a detailed image of the area within the field of view can be generated. The modules used to form the detector focal plane, and the precise manner in which the information from the detector elements is processed is not intended to be a limitation with respect to the present invention which, in its broader aspects, has application to all types of satellite and detector systems. Thus, the reference to particular types of detector modules and electronic systems compatible with those detector modules is intended as exemplary of one manner in which the present invention may be utilized.

FIG. 1 more particularly illustrates a satellite 11 shown in Earth orbit. The portions of satellite 11 of interest herein include an optical system 13, detector focal plane 15, and data processor 17. The optics 13 function to image objects within the satellite field of view on the surface of the focal plane 15. The focal plane 15 may be any of a variety of constructions, utilizing a variety of different materials suitable to operate in a space environment. The focal plane 15 functions to derive electrical signals from the image focused by optical system 13 and to communicate such electrical signals to the data processor 17. The data processor 17 directs interrogation of the focal plane 15 and is controlled by signals from ground operations 19.

Figure 2:
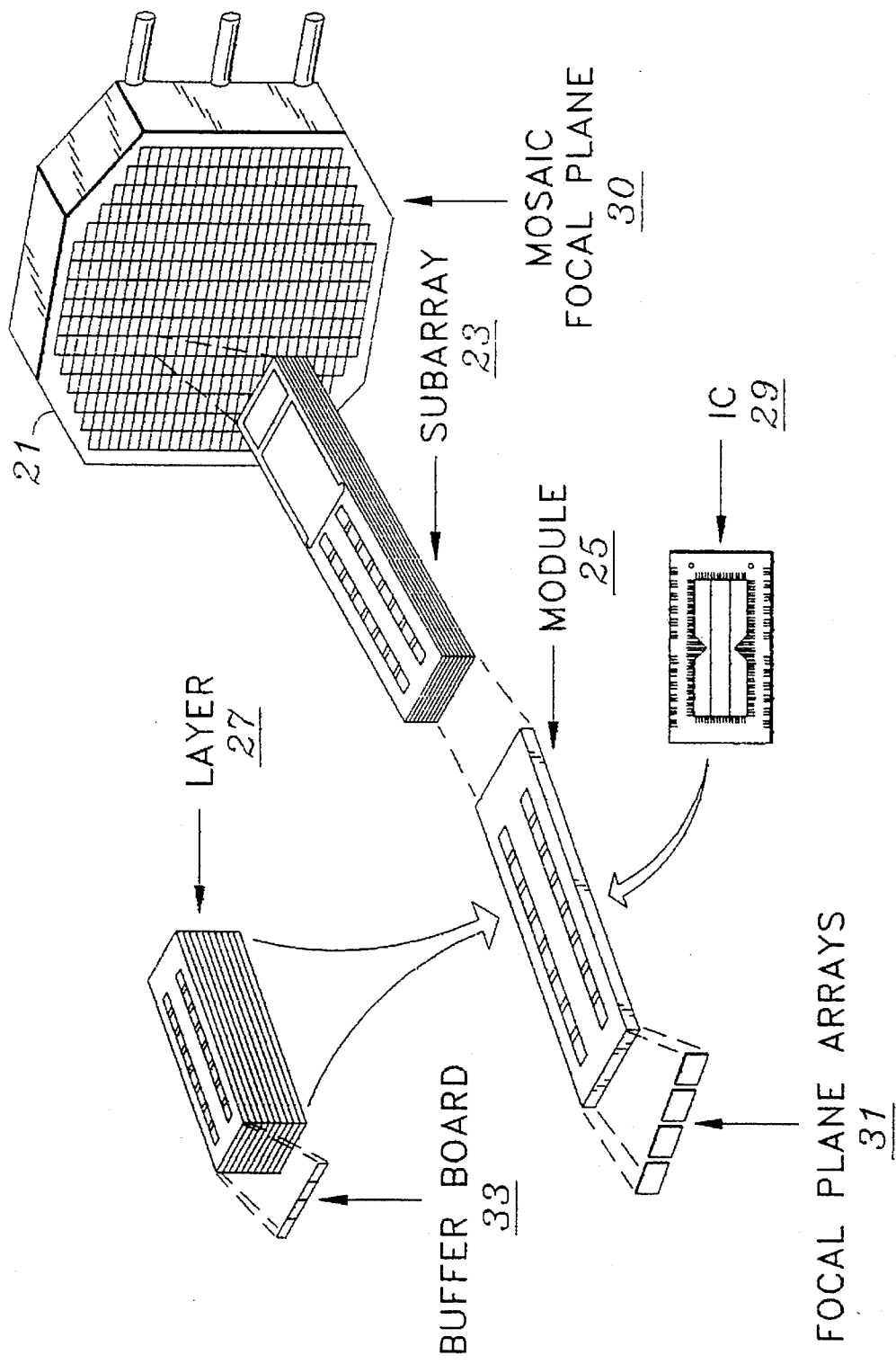
FIG. 2 is an exploded perspective view of the focal plane of the infrared detector system.

Referring to FIG. 2, a mosaic focal plane 20 useful in the application illustrated at FIG. 1 is shown in more detail. As shown at FIG. 2, the focal plane 20 is defined by a housing 21 which holds a substantial number of individual subarrays 23 disposed to have edge portions that collectively form the front face of the focal plane 20. Each subarray 23 is comprised of a plurality of modules 25, with each module 25 comprised of a plurality of separate layers 27. Integrated circuits 29 may be mounted on the layers 27 to facilitate on-focal-plane processing of data and interrogation of detector elements. Focal plane arrays 31, each containing a plurality of detector elements are formed along a vertical edge surface of the modules 25. A buffer board 33 may be disposed intermediate the front face of module 25 and the focal plane arrays 31 to facilitate interconnection.

Figure 3:
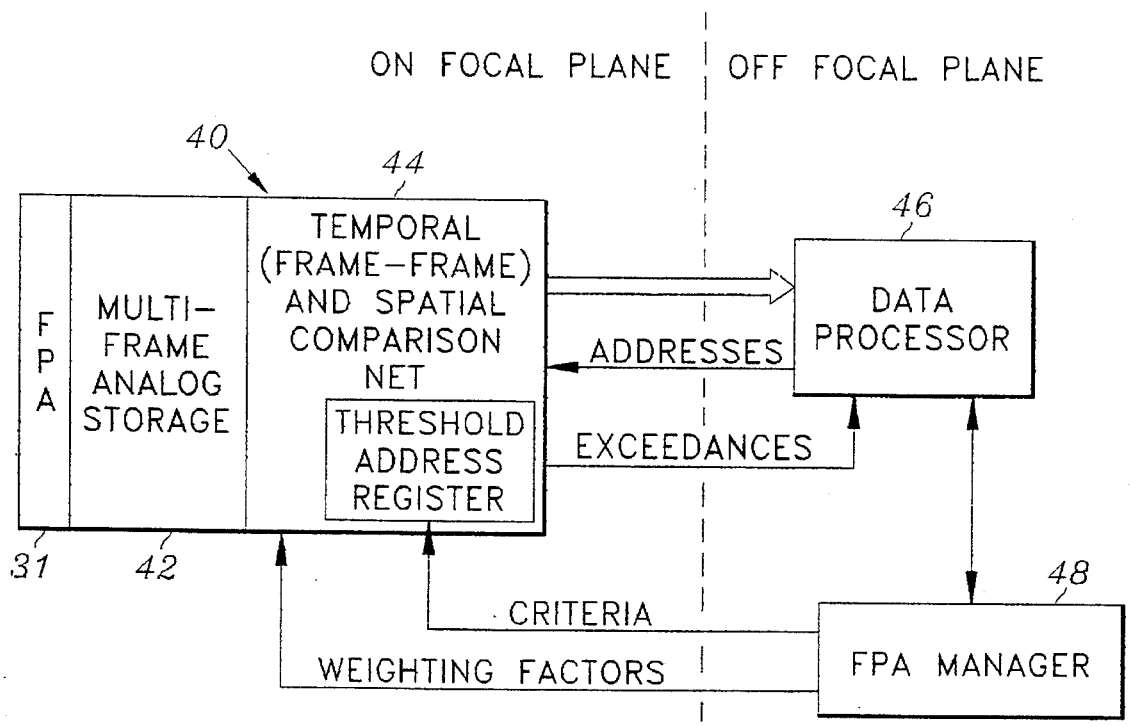
FIG. 3 is a block diagram illustrating a dynamically reconfigurable data processing system in accordance with the present invention.
Figure 4:
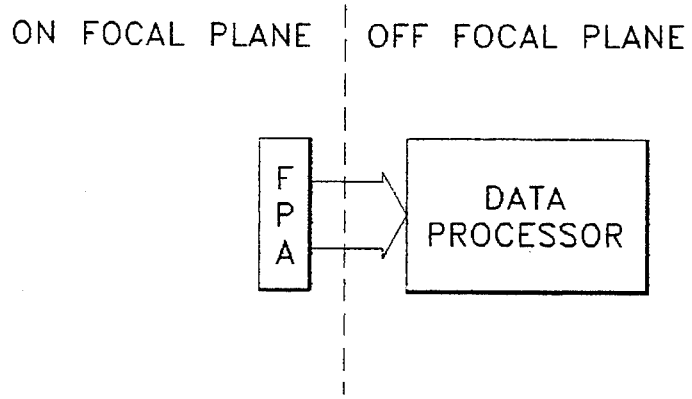
FIG. 4 is a block diagram illustrating the prior art configuration.

The dynamically reconfigurable data processing system 40 of the present invention is illustrated in FIG. 3 which depicts a presently preferred embodiment of the invention. Referring now to FIG. 3, the focal plane 20 includes focal plane arrays 31 of infrared detectors 35, an analog data storage area 42, and a first data processor 44. Off the focal plane is a second data processor 46. Also off the focal plane is a focal plane array manager 48.

The focal plane array 31 typically has greater than one-million detectors 35. Data from those detectors 35 is sent to the analog data storage area 42. Initially, most of the data from the analog storage area 42 may be passed through, without any processing, to the off-focal data processor 46. Preferably, the data is converted from analog-to-digital form before sending it to the off-focal data processor 46. The off-focal data processor 46 performs certain processing functions, and based on the results of that processing, sends addresses back to the on-focal data processor 44 specifying desired data.

The off-focal data processor 46 is also in electronic communication with an off-focal manager 48. Upon the manager 48 receiving results from the off-focal data processor 46, the manager 48 is able to instruct both the off-focal and the on-focal data processors 44 and 46 as to processing of the data. The manager 48 establishes criteria for a threshold address register within the on-address register that exceeds the capacity of the on-focal data processor 44, may be sent over to the off-focal data processor 46.

The processing functions of the on-focal data processor 44 include a temporal net and a spatial comparison net. The temporal net looks at previous values in time from the same detector 35 within the focal plane array 31. The spatial comparison net looks at the values from neighboring detectors 35 within the focal plane array 31. The manager 48 may assign various rating factors to be used by the on-focal data processor 44 in the temporal and spatial comparison net. Once an adequate history has been established, greater portions of the data may be processed on the focal plane.

FIG. 2 illustrates the data processing of the prior art. The on-focal-plane processing algorithms used to select rate and process incoming data have yet to be finalized. In order to avoid discarding possibly useful data, existing modules largely pass the data on to the off-focal-plane processor. Only after years of space-based experience may the algorithms be completely finalized such that all or most of the processing may be done on the focal plane. As such, the processing size and power requirements of the space-based data processor (as represented by the large box in FIG. 2) are approximately ten times greater than the off-focal-plane data processor 46 of the preferred embodiment of the present invention (see FIG. 1).

It is understood that the dynamically reconfigurable data processing system described herein and shown in the drawings represents only a presently preferred embodiment of the invention. Indeed, various modifications and additions may be made to the embodiment without departing from the spirit and scope of the invention.

What is claimed is:

1. A method for dynamically reconfiguring a space-based data processing system receiving data from infrared detectors, changing the data processing system based upon evaluations of prior data, the method comprising the steps of:

(a) communicating unprocessed data received from infrared detectors into an on-focal-plane storage area;

(b) communicating a first portion of the unprocessed data from the on-focal-plane storage area to an on-focal-plane data processor, upon command from the on-focal-plane data processor;

(c) communicating a second portion of the unprocessed data from the on-focal-plane storage area to a off-focal-plane data processor, upon command from the on-focal-plane data processor;

(d) processing the first portion of unprocessed data in the on-focal-plane data processor and generating first processed data therefrom;

(e) processing the second portion of the unprocessed data in the off-focal-plane data processor;

(f) communicating the first processed data to the off-focal-plane data processor;

(g) evaluating off-focal-plane data processing requirements from the processed and unprocessed data received by the off-focal-plane data processor; and (h) generating commands to modify the content of the second portion of unprocessed data communicated to the off-focal-plane processor.

2. The method of claim 1 further comprising the step of:
 generating commands to modify the content of the first portion of unprocessed data communicated to the on-focal-plane data processor.

3. The method of claim 1 further comprising the step of:
 generating commands to modify the processing functions of the on-focal-plane data processor.

4. The method of claim 3 wherein the generating commands are to modify the processing functions of the on-focal-plane data processor.

5. The method of claim 1 further comprising the steps of:
 communicating processed data from the off-focal-point data processor to an off-focal-plane manager; and
 generating commands to modify the processing functions of the off-focal-plane data processor.

6. The method of claim 1 wherein the data is converted into digital form by the on-focal-plane data processor before sending the data to the off-focal-plane data processor.

* * * * *